J. A. BANCROFT.
Assignor to L F. Bancroft & A. B. Yetter.
STREET-SPRINKLERS.
No. 7,845. Reissued Aug. 14, 1877.
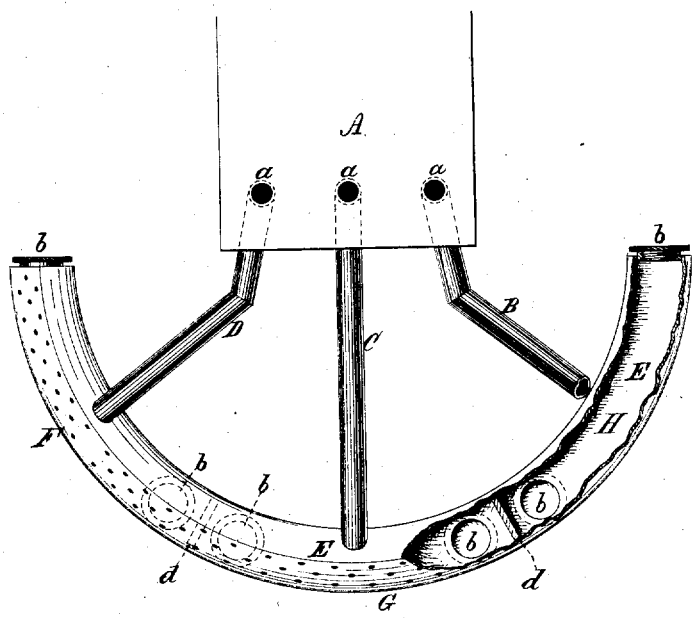
Witnesses:
Geo. H. Miatt
M. L. Adams
Inventor:
John A. Bancroft
Per Edw. E. Lumby
Atty

UNITED STATES PATENT OFFICE.

JOHN A. BANCROFT, OF WORCESTER, MASSACHUSETTS, ASSIGNOR TO LOREY F. BANCROFT, OF SAME PLACE, AND ANDREW B. YETTER, OF NEW YORK CITY.

IMPROVEMENT IN STREET-SPRINKLERS.

Specification forming part of Letters Patent No. 101,700, dated April 12, 1870; Reissue No. 7,845, dated August 14, 1877; application filed July 11, 1877.

*To all whom it may concern:*

Be it known that I, JOHN A. BANCROFT, of Worcester, Massachusetts, have invented a certain Improvement in Street-Sprinklers, of which the following is a specification:

My improvement relates to the sprinklers of street-watering carts; and my invention consists in dividing such sprinklers into two or more separate compartments, and connecting each compartment with the water-tank by an independent supply pipe and valve, whereby water may be supplied independently to either one or more of the compartments into which the sprinkler is divided, and thus the apparatus may be made to sprinkle paths of variable widths.

In sprinkling streets it sometimes happens that after the sprinkling-cart has made several trips back and forth a narrow strip remains to be sprinkled, and it is then desirable to diminish the width of the sprinkling-discharge, both for the sake of economizing water and in order to avoid overlapping that part of the street already sprinkled, which would otherwise receive an excess of water. It is also desirable to stop the flow of water when driving near the curb-stones, or through narrow streets, to avoid wetting carriages or the clothing of persons on the sidewalk.

The latter result has been accomplished by the use of sectional shields or side guards. Side guards, however, not only do not economize water, but the hissing sound made by the water striking against them sometimes frightens restive horses.

My invention not only affords facilities for governing the width of the discharge, so as to avoid sprinkling a person on the sidewalk, but it enables the driver of the sprinkling-cart to water a narrow width of street without waste of water upon that part of the street which has already been sprinkled.

The accompanying drawing illustrates my invention as embodied in a sprinkler divided into three separate compartments.

The drawing represents a section of a water-tank, A, having three openings, *a a a*, into which are inserted the conducting-pipes B, C, and D, which supply water from the tank to the several compartments F, G, and H of the sprinkler E. The sprinkler is divided into three separate compartments by means of the partitions *d d*. Each of the chambers in the sprinkler is provided with an opening in the bottom, which is stopped by a plug or cap, *b*; and similar openings, also stopped by plugs *b*, are provided at the outer ends of the sprinkler E. These openings are provided for the purpose of facilitating the cleansing of the sprinkler from any sediment or obstruction that may accumulate therein.

When cleansing is necessary, the plugs are removed, and a full head of water let on from the tank, by the force of which the sediment in the sprinkler is washed out of the openings in the bottoms or ends of the several compartments.

The openings *a* of the pipes B, C, and D are each provided with a valve for enabling the driver to shut off water from either one or more of the sprinkling-compartments.

It will thus be seen that the driver of the watering-cart is enabled to sprinkle paths of different widths by admitting water from the tank into either one or more of the compartments into which the sprinkler is divided, as the case may be.

I claim as my invention—

1. In a street-watering cart provided with a water-tank, a sprinkler divided into two or more separate compartments, each having an independent connection with the tank by means of a pipe provided with a suitable valve, for the purpose of enabling the driver of the cart to sprinkle paths of variable widths, substantially as described.

2. The sprinkler E, provided with the transverse partitions *d* and the stop plugs or caps *b*, as and for the purpose set forth.

JOHN A. BANCROFT.

Witnesses:
HENRY L. PARKER,
LOUISE PROUTY.